United States Patent [19]
Arikawa et al.

[11] 3,742,184
[45] June 26, 1973

[54] METHOD AND APPARATUS FOR AUTOMATIC ARC WELDING IN A VERTICAL POSITION

[75] Inventors: Masayasu Arikawa; Atsushi Ohi; Akihiko Ihochi; Kenichiro Hashimoto, all of Fukiai-ku, Kobe, Japan

[73] Assignee: Kobe Steel Ltd., Kobe, Japan

[22] Filed: Dec. 24, 1970

[21] Appl. No.: 101,244

[30] Foreign Application Priority Data
Dec. 27, 1969 Japan.................................. 44/1036
Feb. 10, 1970 Japan.............................. 45/11658

[52] U.S. Cl................................ 219/126, 219/137
[51] Int. Cl............................................... B23k 9/12
[58] Field of Search..................... 219/126, 124, 125, 219/73, 130, 76, 137

[56] References Cited
UNITED STATES PATENTS

| | | | |
|---|---|---|---|
| 3,019,327 | 1/1962 | Engel..................................... | 219/76 |
| 3,230,341 | 1/1966 | Blackburn....................... | 219/125 R |
| 3,582,608 | 6/1971 | Ito et al. .............................. | 219/126 |
| 3,466,421 | 9/1969 | Belfor et al.......................... | 219/126 |
| 2,472,803 | 6/1949 | Beyer et al...................... | 219/125 R |
| 2,817,748 | 12/1957 | Meyer................................ | 219/126 |

*Primary Examiner*—J. V. Truhe
*Assistant Examiner*—Gale R. Peterson
*Attorney*—Oblon, Fisher & Spivak

[57] ABSTRACT

A method of arc welding in a vertical direction and an arc-welding machine for automatically performing the steps of the same are provided. According to the arc welding method of the invention, the advancement of a consumable electrode wire is accelerated and the welding voltage of the welding torch is increased as the torch crosses the centerline of a generally vertically extending weaving pattern it is caused to follow during a welding operation. After passing the centerline, the voltage is decreased to its original level, as it is on the return stroke also. This method is further improved by increasing the welding current of the torch slightly after increasing the welding voltage and further by decelerating or stopping the weaving motion at both sides and at the center of the weaving path of the wire. The apparatus for automatically carrying out this arc welding method comprises, in conjunction with an advancing consumable electrode wire and a welding torch adapted to follow a weaving path in a generally vertical direction, means for changing certain of the welding conditions, such as the advancing speed of the metal wire, the welding voltage and current, the weaving speed, and means for aligning the centerline of the weaving path or width to the welding centerline of a base metal.

3 Claims, 7 Drawing Figures

PATENTED JUN 26 1973 3,742,184

INVENTORS
MASAYASU ARIKAWA
ATSUSHI OHI
AKIHIKO IHOCHI
KENICHI HASHIMOTO

BY *Sbloy, Fisher & Spirak*
ATTORNEYS

METHOD AND APPARATUS FOR AUTOMATIC ARC WELDING IN A VERTICAL POSITION

BACKGROUND OF THE INVENTION

1. Field of the Invention

This invention relates generally to arc welding in a vertical direction, and more particularly concerns a novel and improved method and apparatus for automatically arc welding in a substantially vertical line which are adapted to prevent the dropping of molten metal and provide adequate weld penetration by weaving a welding torch and by varying the welding conditions at predetermined positions of the torch in the weaving path.

2. Description of the Prior Art

Heretofore, vertical welding has generally been accomplished manually by using a manual welding electrode, but this process requires skilled operators, and thus such operations have been inefficient and lacking in quality.

On the other hand, a semi-automatic vertical welding operation is known which uses a continuous wire, but it also is considered to be inefficient and inadequate in view of the necessity of requiring the use of one operator for each welding torch, that is, a one man - one arc concept, in comparison with former vertical welding techniques using the manual welding electrode. Thus, the processes of vertical arc welding have not been greatly improved in efficiency.

In addition, larger construction projects, such as seen in modern shipbuilding, have become prevalent in recent years. Consequently, the welding operations are increased on one hand, and the number of welding operators becomes seriously insufficient on the other hand to perform these operations. And now, economy in cost of achieving quality welding work is earnestly being sought.

The following problems have been numerated as the reasons behind the failure heretofore to automate conventional vertical welding processes and they particularly set forth the need for a process which permits one person to operate a plurality of welding torches, even if a welding torch is woven in a vertical process, known as the most desirable method for automating welding work.

In vertical welding operations, one of the problems encountered is that insufficient weld penetration of a base metal tends to to occur at the central line of joined base metals, thereby causing an insufficient strength of the weld. Also, dropping of the molten metal also frequently occurs in such welding operations. Until now, therefore, if the depth of the weld penetration is increased, the amount of molten metal being dropped tends to significantly increase, while if the dropping amount of the molten metal is intentionally lessened, the depth of the weld penetration becomes insufficient. These problems make automatic vertical welding very difficult to be adapted for practical use.

SUMMARY OF THE INVENTION

Accordingly, this invention contemplates the elimination of the aforementioned disadvantages of conventional arc welding, and the provision of a novel and improved method of automatic arc welding in a vertical direction and an apparatus for carrying out the same.

It is, therefore, an object of the present invention to provide a method of automatic arc welding in a vertical direction which prevents the dropping of molten metal and provides adequate weld penetration to obtain high strength fusions.

It is another object of this invention to provide a method of automatic arc welding in a vertical direction in which a plurality of welding torches may be controlled by one operator.

It is a further object of this invention to provide an apparatus for performing the aforementioned methods, which has means for changing the welding conditions at predetermined weaving positions of the welding torch and means for aligning the centerline of the weaving width with the welding centerline of a joint being formed.

This invention solves the aforementioned problems of conventional arc welding by changing the welding conditions at predetermined weaving positions of the welding torch and more particularly by forcibly advancing a wire near the centerline of the weaving width of the torch so as to move the end of the wire until immediately before it enters a molten state.

According to one aspect of this invention, there is provided a method of automatic arc welding in a vertical direction with a consumable welding wire which comprises weaving a torch horizontally while moving it upward along the vertical welding line, accelerating the advancement of the wire and simultaneously increasing the welding voltage of the torch above an optimum welding voltage near the centerline of the weaving width or path of movement of the wire so that the arc point of the wire approaches the corner between the base metals to provide a good weld penetration thereat, and decreasing the voltage to the original voltage after passing the centerline and vice versa on the returning stroke of the wire. In this case, since an optimum welding voltage is adapted except in the neighborhood of the centerline of the weaving width of the torch so that the optimum welding voltage is exceeded near the centerline to accelerate the advancing speed of the wire thereat, it is possible to provide the desirable weld penetration without any significant change in the amount of molten metal applied. Thus, the dropping of molten metal is prevented and the weld penetration of the base metal may be increased to conduct an effective automatic vertical arc welding.

According to another aspect of the present invention, there is provided a method of automatic arc welding in a vertical direction which further comprises the step of increasing the welding current of the torch slightly after the hereinbefore-mentioned increase of the welding voltage in order to further increase the advancing speed of the wire, to provide a sufficient weld penetration and to provide a preferable bead. Thus, the limit of the improvement of the weld penetration increased by accelerating the advancing speed of the wire is further improved, and the problem that if the advancing speed of the wire is excessively increased, the arc end of the wire may be short-circuited in contact with the base metal to cause the arc welding to be discontinued, is eliminated.

According to a further aspect of this invention, there is also provided a method of automatic arc welding in a vertical direction which additionally decelerates or stops the weaving motion of the wire at both sides and in the neighborhood of the centerline of the weaving path of the torch for an infinitesimal period of time in order to provide a highly reliable and accurate automatic vertical arc welding. This provision is effective in shaping the bead and particularly effective to prevent the dropping of molten metal. In addition, any difficulty in obtaining a complete weld penetration over 0.5mm at the corner between the base metals, since the bead shape and dropping of the molten metal are deteriorated if the weld penetration is increased, may be eliminated by decelerating or stopping the weaving motion of the wire at both sides and in the neighborhood of the centerline of the weaving width of the wire for an infinitesimal period of time as well as by increasing the advancing speed of the wire and the welding current near the centerline of the weaving width of the wire. Consequently, a weld penetration over 0.5mm can be obtained.

According to still another aspect of this invention, there is provided an apparatus for automatic arc welding continuously in a vertical direction with a consumable electrode wire to weave a welding torch along the welding line which has means for changing welding conditions such as the advancing speed of the metal wire, the welding voltage and current, and the weaving speed, said means including a welding torch capable of decelerating or stopping the weaving motion thereof within the weaving width of the wire, a welding power source capable of increasing or decreasing the welding current at a predetermined position of the welding torch within the weaving width thereof, a feed mechanism capable of increasing or decreasing the advancing speed of the wire at a predetermined position of the welding torch of the wire within the weaving width thereof, and a control circuit means for electrically controlling the deceleration or stoppage of the welding torch, increasing or decreasing the welding current, and increasing or decreasing the advancement of the wire in synchronization with the position of the welding torch within the weaving width of the wire; and means for aligning the centerline of the weaving width to the welding centerline of a joint including a universal joint provided at the uppermost end thereof for hanging the welding torch, and a guide for vertically moving the welding torch for positioning the welding torch with respect to the centerline of the welding of the base metal through a spacer, thus setting the standard position of the welding torch as a control element for accurately positioning the base metal.

The methods and apparatus therefor constructed according to this invention may best be applied to a fillet welding and a butt welding in a vertical arc welding operation.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several figures and wherein.

DETAILED DESCRIPTION OF THE PREFERRED EMBODIMENT

Figure 1A:
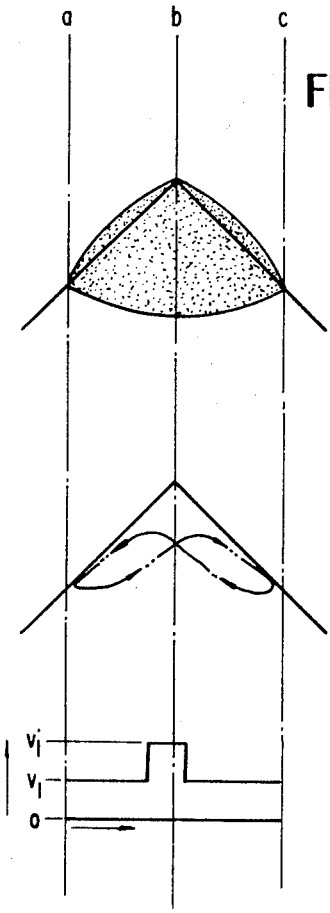
FIGS. 1A and 1B are explanatory diagrammatic views of vertical fillet welding performed in accordance with the teachings of this invention.

Reference is now made to FIG. 1A, which shows the relationships between the motion of the wire tip, the advancing speed of the wire, and the bead shape of the weld formed thereby.

In a method of automatic arc welding in a vertical direction with a consumable electrode, when the wire end of the welding torch is woven from the point $a$ to the point $b$, the advancing speed of the wire is accelerated from a speed $v_1$ to a speed $v_1'$ before arriving at the point $b$, and when the wire end is woven from the point $b$ to the point $c$, it is decelerated from the speed $v_1'$ to the original speed $v_1$. After the wire end reaches the point $c$, when it is woven back, as it is woven from the point $c$ to the point $b$, the advancing speed of the wire end is accelerated from the speed $v_1$ to the speed $v_1'$ before the point $b$, and when the wire end is woven from the point $b$ to the point $a$, the advancing speed of the wire end is decelerated back to the original speed $v_1$. Thus, the desired bead and weld penetration of the corner portion may be obtained, as will be discussed hereinbelow.

Figure 1B:
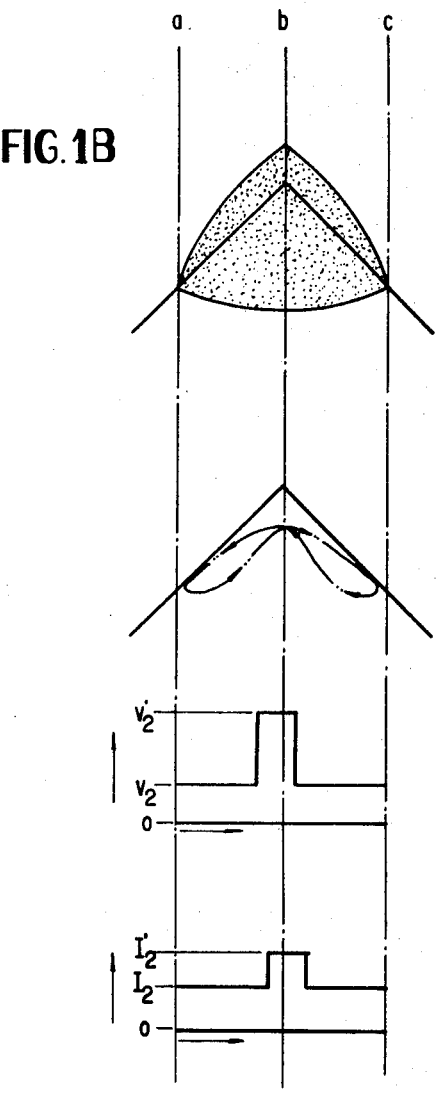

Referring now to FIG. 1B, which shows the relationships between the motion of the wire end, the advancing speed of the wire, the welding current and bead shape formed thereby, in the above method, when the wire end of the welding torch is woven from the point $a$ to the point $b$, the advancing speed of the wire is accelerated from a speed $v_1$ to a speed $v_2'$ before arriving at the point $b$, and when the wire end is woven from the point $b$ to the point $c$, it is decelerated from the speed $v_2'$ to the original speed $v_2$, and the welding current is increased from $I_2$ to $I_2'$ slightly after the increase in the welding voltage which accompanies the wire advancing speed increase, and it is again decreased to the original current $I_2$ thereafter. The corner between the base metals may be sufficiently melted by the increase of the welding current after passing the point $b$. Thus, the melting speed of the wire at this portion is increased to enable the wire end to approach the corner without short-circuiting it. Since the period of the increase in the welding current ends a short time after passing the point $b$, the average current of one cycle of the weaving of the wire end is not significantly raised, with the consequent result that the problems of dropping of the molten metal and irregular bead shapes may be eliminated thereby.

Figure 2:
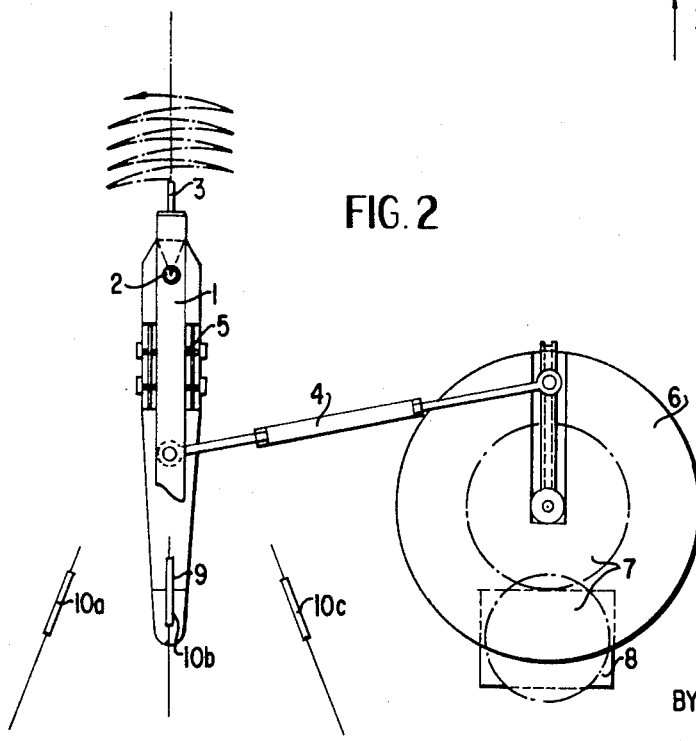
FIG. 2 is a plan view showing the weaving device of a welding torch formed according to this invention.

Reference is now made to FIG. 2, which shows the weaving device of the welding torch of this invention.

Reference numeral 1 refers to a welding torch fixed to a torch holder 5 at a fulcrum 2, the end of a wire 3 being advancably disposed in the torch 1 being weavable as to trace the path designated by the broken line illustration. A crank rod 4 pivotally connects the torch holder 5 to a prime mover or power mechanism for weaving the torch holder 5 in the rightward or leftward direction in the drawing, the length of the crank rod being adjustable. The crank rod 4 therefore is pivotally connected at its other end, or power mechanism side, to a rotary disc 6 wherein the distance between the pivotal center of the rod 4 and the center of the rotary disc 6 may also be adjusted. The rotary disc 6 is connected through reduction gears 7 to a pulse motor 8, so that the rotary motion of the pulse motor 8 is converted to a weaving motion of the welding torch 1. A permanent magnet 9 is fixed to the rear end of the torch holder 5, and as the rear of the torch holder 5 is woven on a holding plate 11 fixing the fulcrum 2, as shown in FIG. 2, the magnet 9 energizes a reed switch 10B attached to the center of the weaving arcuate path of the torch holder rear and reed switches 10A and 10C attached to both ends of the arcuate path to generate signals upon closure of the electric contacts, when the end of the wire 3 reaches certain predetermined positions established accordingly as the magnet 9 approaches the reed switches 10A, 10B and 10C, respectively.

Figure 3:
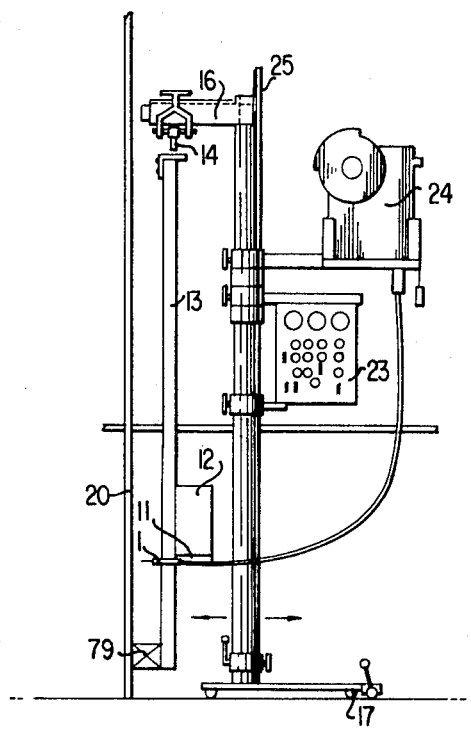
FIG. 3 is a front view of the apparatus of this invention showing the state adapted for the base metal.
Figure 4:
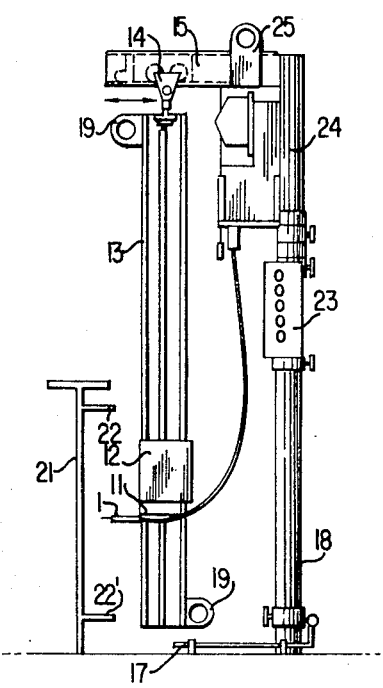
FIG. 4 is a side view of the apparatus shown in FIG. 3.

Referring to FIGS. 3 and 4, which show the apparatus of this invention in its operative state, the welding torch 1 is installed through the holding plate 11 on a carriage 12 in which the pulse motor 8, rotary disc 6, and other weaving mechanisms for the welding torch 1 are provided. The carriage 12 is vertically movable along a guide 13 which accommodates the elevational motion thereof and contains a power mechanism for moving the same therealong. The guide 13 is supported by a universal joint 14 disposed at the uppermost end thereof which in turn is mounted for reciprocable movement in a horizontal direction along a horizontal boom 15, which itself is so attached to a second horizontal boom 16 as to move horizontally thereon in a direction perpendicular to the aforesaid horizontal direction. Boom 16 supports the overall apparatus and is secured to an upright post 18 having a movable vehicle 17 positioned at the lowermost end thereof. Thus, the vertically movable guide 13 may be horizontally displaced in virtually all directions relative to the post 18 and may also selectively be moved in any three dimensional direction. Electric magnets 19 mounted on the uppermost and lowermost ends of the guide 13 permit the guide 13 to be magnetically fixed to a metal base 20. The guide 13 may be positioned in predetermined spaced relation with respect to another metal base member 21 through spacers 22 and 22' disposed between the metal base 21 and the guide 13. A control circuit for electrically controlling the deceleration or stoppage of the welding torch 1, the welding current and the wire advancing speed in synchronization with the position of the weaving welding torch 1, is contained in a control device 23, which is secured to the post 18. A wire advancing mechanism 24 and hanging fittings 25 are further provided thereto.

Figure 5:
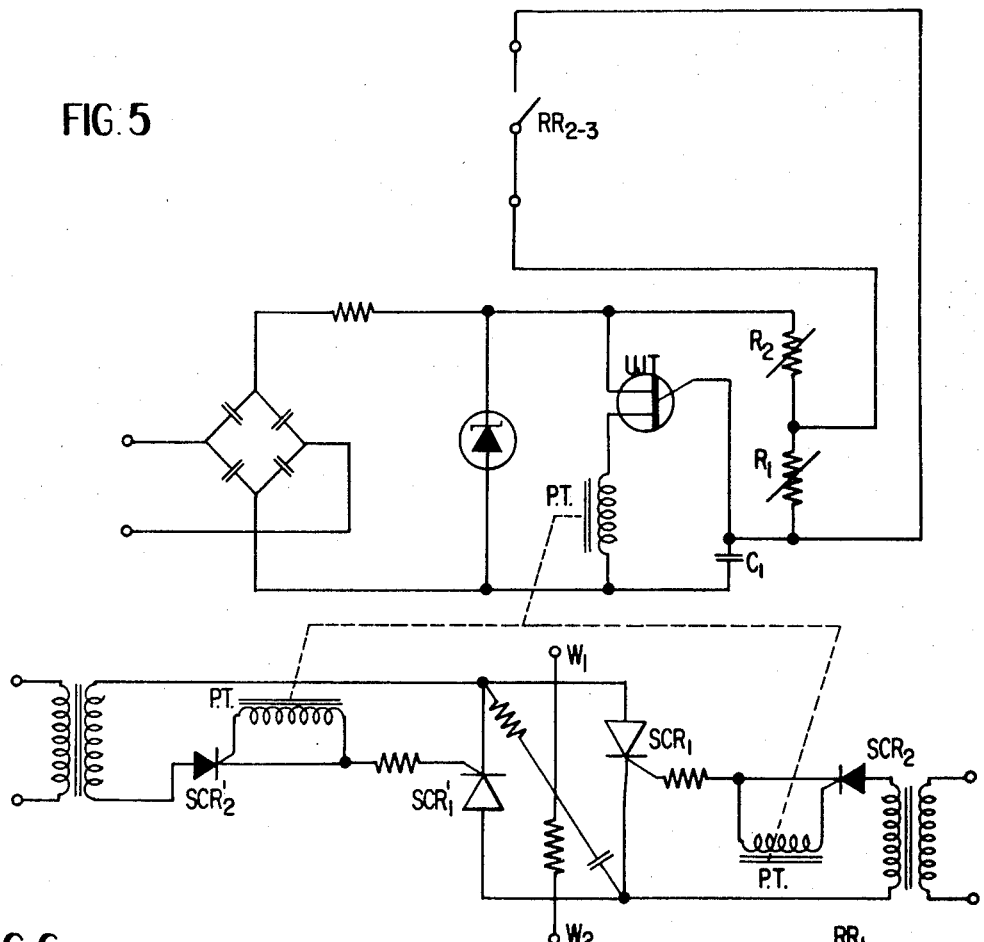
FIG. 5 is an electric wiring diagram of a control circuit of the welding current and wire advancing speed.

In FIG. 5 there is shown an electric wiring diagram of a control circuit of welding current and wire advancing speed. By connecting terminals W1 and W2 to the circuit of the welding current power source, the welding current may be controlled to be increased or decreased at a predetermined position of the welding torch 1 within the weaving path thereof, while if the terminals W1 and W2 are connected to the circuit of the source of power for the wire advancing motor, the advancing speed of the wire may instead be controlled to be increased or decreased at a predetermined position of the welding torch 1 within the weaving width of the torch. In FIG. 5 $RR_{2-3}$ illustrates a switch of the reed switch group 10A, 10B and 10C, UJT a unijunction transistor, P.T. a pulse transformer, $SCR_2$ and $SCR_2'$ amplifying thyristors which are controlled in phase by the pulse transformer, and $SCR_1$ and $SCR_1'$ main thyristors for controlling in phase the welding current or driving current for the wire advancing motor upon receipt of phase control signals from the thyristors $SCR_2$ and $SCR_2'$, respectively. The welding current or driving current of the wire advancing motor is controlled by a phase angle determined by resistors $R_1$ and $R_2$ and a condenser $C_1$ which are connected to the unijunction transistor UJT.

In operation of this circuit, if the switch $RR_{2-3}$ is closed, the resistance $R_1$ will be shorted and the resistance in the circuit will change from $R_1 + R_2$ to $R_2$ and thereby increase the number of pulses generated by the pulse transformer P.T. to load the phase angle with the consequent result that the effective energizing time per one cycle of the thyristors $SCR_2$ and $SCR_2'$, and the main thyristors $SCR_1$ and $SCR_1'$ is increased and accordingly the current passing the terminals W1 and W2 increases. Thus, while the switch $RR_{2-3}$ is closed, the current passing between the terminals W1 and W2 will be increased whereby the welding current for the position of the weaving width of the welding torch 1 and wire advancing speed may be appropriately controlled.

Figure 6:
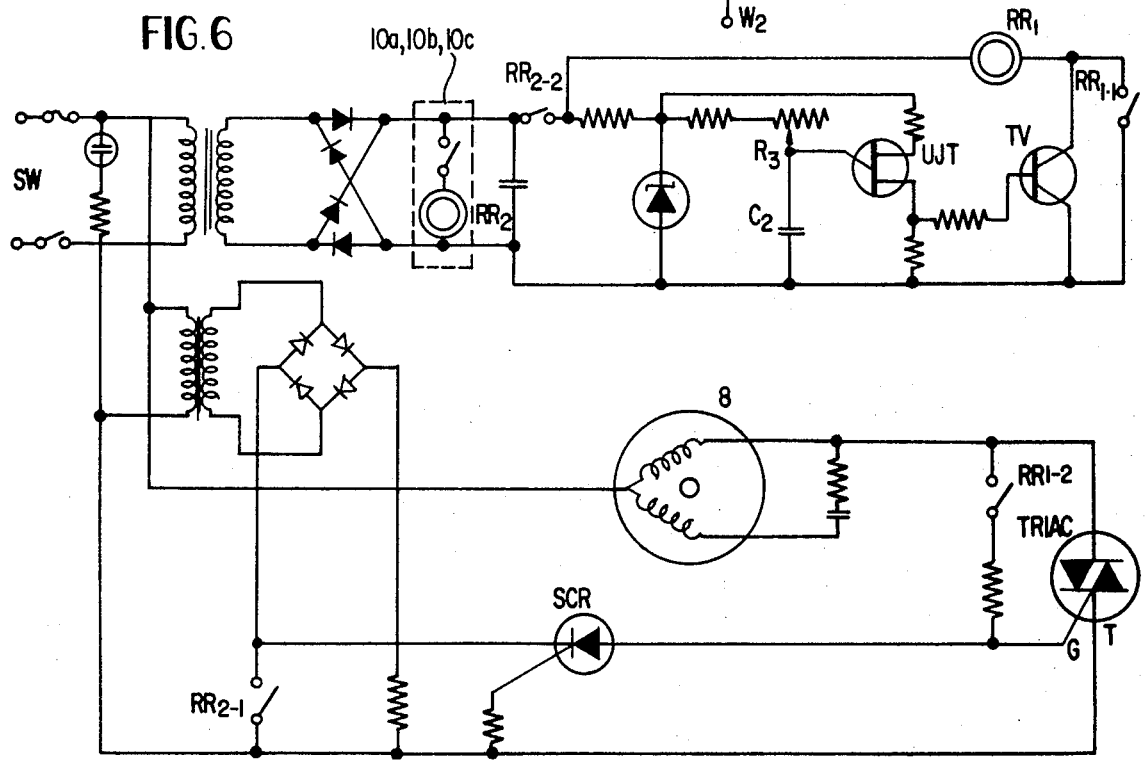
FIG. 6 is an electric wiring diagram of a control circuit of the weaving device shown in FIG. 2 for weaving the welding torch.

Referring now to FIG. 6, which shows an electrical wiring diagram for a control circuit for weaving the welding torch 1, reference numeral 8 illustrates a pulse motor, TRIAC is a bi-directional thyristor for directly driving or stopping the pulse motor 8, and the upper half of the diagram designates a timer circuit for determining the time for stopping the welding torch 1 at a predetermined position.

In operation of the circuit so constructed, if the AC source of power is turned ON, a trigger gate current will pass through the thyristor SCR via the power transformer and full-wave rectifier, and accordingly the thyristor SCR is energized whereby a voltage is applied between the terminals G and T of the TRIAC so that the TRIAC will turn ON to start rotation of the pulse motor. Then, when the welding torch 1 arrives at a predetermined position, any of the reed switches 10A, 10B and 10C will turn ON with the consequence that the corresponding reed relay $RR_1$ is energized to energize the contact of the reed switch $RR_{2-1}$ and accordingly the potential between the gate and cathode of the thyristor SCR becomes zero. Thus, the current derived by full-wave rectification will fall below the holding current of the thyristor SCR, whereupon the thyristor will immediately turn OFF with the result that the TRIAC will turn OFF and thereby immediately stop the pulse motor 8. On the other hand, since the reed switch $RR_{1-2}$ is energized at the same time that the timer circuit is operated, then if the time determined by the time constant of the resistor $R_1$ and the condenser $C_1$ has lapsed, the unijunction transistor UJT will generate a pulse to shift ON the power transistor TV and thereby energize the reed relay RR to be self-held by the reed switch $RR_{1-1}$. However, since the reed switch $RR_{1-2}$ is, at that time, energized, then even if the thyristor SCR turns OFF, a trigger current will flow between the terminals G and T of the TRIAC and accordingly the TRIAC will turn ON with the result that the motor 8 will again start to rotate. Then, when the welding torch 1 passes a predetermined position an electrical signal from any of the reed switches 10A, 10B and 10C will no longer be present and the reed relay $RR_2$ will turn OFF and the reed switch $RR_{1-2}$ will turn OFF and accordingly the reed relay $RR_1$ will turn OFF. Thus, the reed switches $RR_{2-1}$, $RR_{1-2}$ will turn OFF with the result that it is instantaneously switch to the SCR circuit and accordingly the pulse motor 8 continues to rotate so as to return to the original state. Thus, the welding torch 1 stops for the time determined as above at a predetermined position while weaving.

As hereinbefore indicated, the welding torch 1 may be decelerated or stopped at a predetermined position within the weaving path of the wire.

The present invention has heretofore been described in detail with respect to an embodiment of the apparatus which comprises means for changing welding conditions such as the advancing speed of the wire, welding voltage and current, deceleration or stoppage of the weaving motion of the welding torch, and means for coinciding accurately the centerline of the weaving width of the torch to the welding centerline of the base metal for solving the objects of the present invention, and the invention has completely overcome such problems as the dropping of molten metal and insufficient weld penetration of the base metal in providing automatic vertical welding.

It should be understood from the foregoing description that in order to practice the concept of advancing the wire end near the centerline of the weaving width in the wire advancing direction rather than other directions, a third motion may be added to the welding torch itself to perform the object of this invention. It follows that though the present invention advances the welding torch in the first motion to vertically move the same along the welding line of the vertical position and also advances it in the second motion to weave in a horizontal plane, it may additionally advance the welding torch near the centerline of the weaving width in the wire advancing direction according to a third motion. In order to add the third motion to the welding torch, the apparatus may be provided with means for mechanically advancing or retarding the fulcrum of the welding torch with respect to the base metal in response to the position of the welding torch within its weaving path.

Obviously many modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. Apparatus for automatic arc welding in a vertical direction with a welding torch and a consumable electrode wire comprising:

a support structure;

a vertical guide suspended from said support structure;

means moveably disposed on said vertical guide for supporting said torch and for moving said torch substantially horizontally across a vertical welding line while simultaneously moving the torch upward along said welding line such that the weaving path formed by the horizontal movement of the welding wire is continuously to the right and left across the vertical welding line when viewed from the torch side of the welding line;

means for decelerating the weaving motion of said welding torch for an infinitesimal period of time near the center line of said weaving path;

a welding current source connected to the electrode wire for supplying welding current thereto;

means for selectively increasing said welding current near the center line only of said weaving path;

wire advancing mechanism on said support structure for feeding the electrode wire to the welding torch;

means for increasing the feeding speed of said wire advancing mechanism near said center line of said weaving path; and a control circuit including said welding torch decelerating means, said welding current increasing means and said wire feeding speed increasing means for electrically controlling said decelerating means, said current increasing means and said feeding speed increasing means synchronously with preselected positions of the welding torch within the weaving path thereof.

2. A method of automatic arc welding in a vertical direction with a welding torch and a consumable electrode wire, comprising the steps of:

welding along said vertical direction by weaving said welding torch substantially horizontally across a vertical welding line, such that the principle motion of the torch when viewed from the torch side of the vertical welding line is continuously to the right and left in a horizontal plane across the welding line, while simultaneously moving the torch upward along the welding line;

increasing the feeding speed of said welding wire near the center line only of the weaving path of said torch;

simultaneously increasing the welding current near the center line only of said weaving path of said torch; and decelerating the weaving motion of said welding torch near the center line of the weaving path for an infinitesimal period of time.

3. A method of automatic arc welding in a vertical direction with a welding torch and a consumable electrode wire, comprising the steps of:

welding along said vertical direction by weaving said welding torch substantially horizontally across a vertical welding line, such that the principle motion of the torch when viewed from the torch side of the vertical welding line is continuously to the right and left in a horizontal plane across the welding line, while simultaneously moving the torch upward along the welding line;

increasing the feeding speed of said welding wire near the center line only of the weaving path of said torch;

simultaneously increasing the welding current near the center line only of said weaving path of said torch; and decelerating the weaving motion of said welding torch near the sides of the weaving path for an infinitesimal period of time.

* * * * *